(12) United States Patent
Kobayashi

(10) Patent No.: US 7,948,836 B2
(45) Date of Patent: May 24, 2011

(54) OPTICAL DISK DRIVE AND OPTICAL DISK DRIVE CONTROL METHOD

(75) Inventor: Toshikazu Kobayashi, Tokyo (JP)

(73) Assignee: Sony Computer Entertainment Inc., Tokyo (JP)

( * ) Notice: Subject to any disclaimer, the term of this patent is extended or adjusted under 35 U.S.C. 154(b) by 1130 days.

(21) Appl. No.: 11/263,571

(22) Filed: Oct. 31, 2005

(65) Prior Publication Data
US 2006/0198257 A1  Sep. 7, 2006

(30) Foreign Application Priority Data
Mar. 2, 2005 (JP) .............................. 2005-057593

(51) Int. Cl.
G11B 7/004 (2006.01)
(52) U.S. Cl. ............................... 369/44.27; 369/53.28
(58) Field of Classification Search ............... 369/44.27, 369/44.11, 53.28, 53.37, 44.13, 53.23
See application file for complete search history.

(56) References Cited

U.S. PATENT DOCUMENTS

| | | | | |
|---|---|---|---|---|
| 5,418,766 A * | 5/1995 | Fujisawa et al. | ........... | 369/53.23 |
| 6,061,318 A * | 5/2000 | Hwang | ........... | 369/53.23 |
| 6,552,971 B2 * | 4/2003 | Iida | ........... | 369/44.29 |
| 2002/0089912 A1* | 7/2002 | Kobayashi | ........... | 369/53.23 |
| 2002/0181370 A1* | 12/2002 | Yamanoi et al. | ........... | 369/53.22 |
| 2004/0100890 A1* | 5/2004 | Lee | ........... | 369/53.23 |
| 2004/0213099 A1* | 10/2004 | Lee | ........... | 369/44.27 |
| 2005/0088952 A1* | 4/2005 | Kimura et al. | ........... | 369/112.23 |
| 2005/0162999 A1* | 7/2005 | Yamashita | ........... | 369/44.34 |
| 2006/0083142 A1* | 4/2006 | Chen et al. | ........... | 369/53.28 |

FOREIGN PATENT DOCUMENTS
JP  5-054406  3/1993

* cited by examiner

*Primary Examiner* — Wayne R Young
*Assistant Examiner* — Thomas D Alunkal
(74) *Attorney, Agent, or Firm* — Katten Muchin Rosenman LLP

(57) ABSTRACT

The present invention is directed to an optical disk drive in which laser beams are emitted to an optical disk in a state of not rotated, and simultaneously an objective lens which collects the laser beams is moved to a direction approaching the optical disk at a constant speed, a time length required for moving a focused position of the laser beams from a surface of the optical disk to a recording layer is measured by observing a reflected light from the optical disk, and a type of the optical disk is determined based on the time Tdet thus measured, includes a control means which executes, a calculating process which calculates an additional travel time Tadd, based on the Tdet and an in-periphery maximum surface wobbling amount Vd of the optical disk, a moving process which further moves the objective lens for the additional travel time Tadd at the constant speed after the laser beams are focused on the recording layer, a rotating process which rotates the optical disk, a move-away process which moves the objective lens in a direction to be away from the optical disk, and a detecting process which detects that the laser beams are focused on the recording layer of the optical disk after the move-away process is started.

7 Claims, 10 Drawing Sheets

OPTICAL DISK DRIVE AND OPTICAL DISK DRIVE CONTROL METHOD

TECHNICAL FIELD

The present invention relates to an optical disk drive, and more particularly, it relates to an optical disk drive which performs processing to determine a type of an optical disk being loaded, and subsequently carries out a measurement of a recording layer reflectivity, and the like.

BACKGROUND OF THE INVENTION

In recent years, DVD and CD (compact disc) are widely used as an optical disk type-recording medium, and an optical disk drive which is capable of reproducing both the DVD and CD is becoming pervasive. Since there is a difference in recording density, disk substrate thickness, or the like, between the DVD and CD, it is necessary to irradiate such optical disks respectively with laser beams having different properties, so as to reproduce data on those disks appropriately.

In view of the point above, an optical disk drive being capable of reproducing both DVD and CD has a function to find out whether the optical disk being loaded is CD or DVD.

Japanese Patent Laid-open Publication No. Hei 5-54406 discloses a technique as an optical disk discrimination method in which a length of time taken for a focus to move from a disk surface to a recording layer is measured from a focus error signal obtained while an objective lens approaches the optical disk at a constant speed. Based on thus measured length of time, the type of the optical disk is determined. This technique utilizes a feature that there is a difference in disk substrate thickness between CD and DVD, and thus a distance from the disk surface to the recording layer is also different.

In order to prevent an error due to a change in relative position between the objective lens and the optical disk, caused by in-periphery surface wobbling at the time of the optical disk rotation, the optical disk should be in halt condition when the type of the optical disk is determined.

Aside from the process for determining the type of the optical disk, there is also a case that a recording layer reflectivity of the optical disk is measured, prior to reproducing the optical disk.

For example, the recording layer reflectivity of the optical disk is measured by irradiating the recording layer with a laser beam suitable for the type of the optical disk, and measuring PI (Pull-In: a sum signal of photo detector) level, and FE (Focus Error) level. Then, a gain of each servo amplifier is adjusted according to the reflectivity thus measured, thereby normalizing variation in reflectivity due to individual differences of the disk, and enhancing the precision in reading the signals.

Since there is a difference in reflectivity between a pit and a mirror surface (or a land and groove) of the recording layer, the optical disk is rotated while measuring the reflectivity, so that the measurement can be carried out uniformly.

With reference to FIG. 10A to FIG. 10D, the reflectivity measurement process will be explained in the case where it is performed subsequently after the optical disk discrimination process is performed.

FIG. 10A shows a movement of the objective lens with respect to the optical disk in the optical disk discrimination process. In other words, the objective lens 13 moves in such a manner as approaching the optical disk 100 which is in halt condition. When the focus captures the recording layer, the discrimination process for the optical disk 100 can be completed.

Since the focus captures the recording layer in this state, the reflectivity may be measured subsequently. However, if the optical disk 100 is rotated for measuring the reflectivity, upward surface wobbling may occur. Then, as shown in FIG. 10B, there is a possibility that the focus is deviated from the recording layer. In this situation, if the objective lens 13 is moved downwardly so as to detect the recording layer, the focus separates from the recording layer, and does not hit the recording layer.

Considering the problem above, in order that the focus captures the recording layer of the optical disk 100 being rotating, it is necessary to move the objective lens into a direction further approaching the optical disk 100, from the status in which the focus captures the recording layer in halt condition. Then, by displacing the objective lens 13 downwardly, from the position being focused above the recording layer, it is possible for the focus to capture the recording layer as shown in FIG. 10C.

On the other hand, if the objective lens 13 is placed too close to the optical disk 100, there is a possibility, as shown in FIG. 10D, that the surface of the optical disk 100 too much approaches the objective lens 13 at the time of downward surface wobbling caused by rotating the optical disk 100.

Therefore, appropriate control is required when the objective lens 13 is brought closer to the optical disk.

However, two-axle actuator which moves the objective lens 13 has variable sensitivities with respect to each individual object and variable outputs from the two-axle drive circuit, as well as there is a change in sensitivity due to the environment, such as temperature, installation status of the optical disk drive, or the like. Since the travel distance of the objective lens 13 may be affected by the difference in sensitivity of the two-axle actuator, there is a possibility that the objective lens 13 may not be controlled appropriately.

SUMMARY OF THE INVENTION

An object of the present invention is to perform an appropriate control of an object lens in the case where the reflectivity measurement process or the like is performed subsequently after the optical disk In order to solve the above problem, an optical disk drive according to the first aspect of the present invention is directed to An optical disk drive in which laser beams are emitted to an optical disk in a state of not rotated, and simultaneously an objective lens which collects said laser beams is moved to a direction approaching said optical disk at a constant speed, a time length required for moving a focused position of said laser beams from a surface of said optical disk to a recording layer is measured by observing a reflected light from said optical disk, and a type of said optical disk is determined based on the time length Tdet thus measured, said optical disk drive comprises, a calculating means which calculates an additional travel time Tadd, based on said Tdet and an in-periphery maximum surface wobbling amount Vd of said optical disk, a moving means which further moves said objective lens for said additional travel time Tadd at said constant speed after said laser beams are focused on said recording layer, a rotating means which rotates said optical disk after the laser beams focuses on the recording layer, a move-away means which moves said objective lens in a direction to be away from said optical disk, and a detecting means which detects that said laser beams are focused on said recording layer of said optical disk after said move-away process is started.

According to the present invention, the movement of the objective lens is controlled based on the discrimination time actually measured, it is possible to cope with the variable sensitivities of the two-axle actuator with respect to each individual object, and variable outputs from the two-axle drive circuit, as well as the change in sensitivity due to the environment, whereby controlling of the objective lens at the time of measuring the reflectivity and the like can be appropriately carried out.

Here, it is also possible to configure the optical disk drive in which laser beams are emitted to an optical disk in a state of not rotated, and simultaneously an objective lens which collects said laser beams is moved in a direction approaching said optical disk at a constant speed, a time length required for moving a focused position of said laser beams from a surface of said optical disk to a recording layer is measured by observing a reflected light from said optical disk, and a type of said optical disk is determined based on the time Tdet thus measured, said optical disk drive comprises, a calculating means which calculates a time Tadd, based on said Tdet and an in-periphery maximum surface wobbling amount Vd of said optical disk, an additional travel time calculating means which calculates an additional travel time Tadd_sd, based on said Tadd and a predetermined decelerating ratio α, a moving means which further moves said objective lens for said additional travel time Tadd_sd at a speed obtained by multiplying said constant speed by said decelerating ratio α, after said laser beams are focused on the recording layer, a rotating means which rotates said optical disk after the laser beams focuses on the recording layer, a move-away means which moves said objective lens in a direction to be away from said optical disk, and a detecting means which detects that said laser beams are focused on said recording layer of said optical disk after said move-away process is started.

It is further possible to configure the optical disk drive in which laser beams are emitted to an optical disk in a state of not rotated, and simultaneously an objective lens which collects said laser beams is moved in a direction approaching said optical disk at a constant speed, a time length required for moving a focused position of said laser beams from a surface of the optical disk to a recording layer is measured by observing a reflected light from said optical disk, and a type of the optical disk is determined based on said time Tdet thus measured, said optical disk drive comprises, a calculating means which calculates a time Tadd, based on said Tdet and an in-periphery maximum surface wobbling amount Vd of said optical disk, a decelerating ratio calculating means which calculates a decelerating ratio α based on said Tadd and Twait which is a predetermined time required until rotating of said optical disk becomes stable, a moving means which rotates said optical disk and further moves said objective lens for said time Twait at a speed obtained by multiplying said constant speed by said decelerating ratio α, after said laser beams are focused on said recording layer, a move-away means which moves said objective lens in a direction to be away from said optical disk, after a lapse of said time Twait, and a detecting means which detects that said laser beams are focused on said recording layer of said optical disk after said move-away process is started.

It is further possible to configure the optical disk drive in which laser beams are emitted to an optical disk in a state of not rotated, and simultaneously an objective lens which collects said laser beams is moved in a direction approaching said optical disk at a constant speed, a time length required for moving a focused position of said laser beams from a surface of the optical disk to a recording layer is measured by observing a reflected light from said optical disk, and a type of said optical disk is determined based on the time Tdet thus measured, said optical disk drive comprises, a calculating means which calculates an additional travel time Tadd, based on said Tdet and a difference between a working distance WD of said objective lens and an in-periphery maximum surface wobbling amount Vd of said optical disk, a moving means which moves said objective lens for the time Tadd at said constant speed, after said laser beams are focused on said recording layer, a rotating means which rotates said optical disk after the laser beams focuses on the recording layer, a move-away means which moves said objective lens in a direction to be away from said optical disk, and a detecting means which detects that said laser beams are focused on said recording layer of said optical disk after said move-away process is started.

It is to be noted that when focusing of the laser beams is detected, any of a process for measuring the reflectivity of the optical disk, a process for discriminating the optical disk layer, and a focus-on process may be carried out.

In order to solve the above problem, an optical disk drive control method according to the second aspect of the present invention is directed to an optical disk drive control method in which laser beams are emitted to an optical disk in a state of not rotated, and simultaneously an objective lens which collects the laser beams is moved to a direction approaching the optical disk at a constant speed, a time length required for moving a focused position of the laser beams from a surface of the optical disk to a recording layer is measured by observing a reflected light from the optical disk, and a type of the optical disk is determined based on the time Tdet thus measured, including, a calculating step which calculates an additional travel time Tadd, based on the Tdet and an in-periphery maximum surface wobbling amount Vd of the optical disk, a moving step which further moves the objective lens for the additional travel time Tadd at the constant speed after the laser beams are focused on the recording layer, a rotating step which rotates the optical disk, a move-away step which moves the objective lens in a direction to be away from the optical disk, and a detecting step which detects that the laser beams are focused on the recording layer of the optical disk after the move-away process is started.

DETAILED DESCRIPTION OF THE PREFERRED EMBODIMENTS

Figure 1:
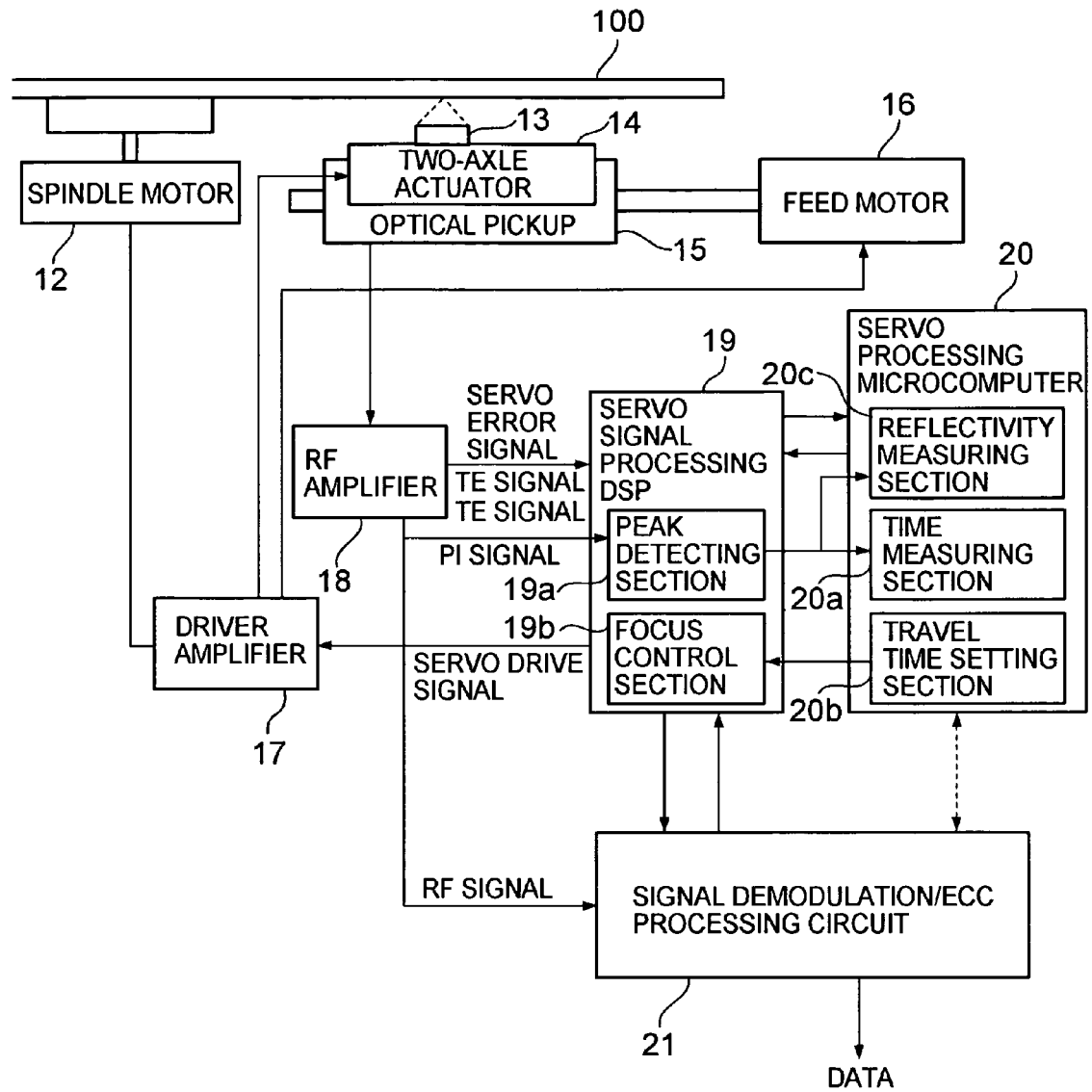
FIG. 1 is a block diagram to explain a configuration of an optical disk drive.

Preferred embodiments of the present invention will be explained with reference to the accompanying drawings. FIG. 1 is a block diagram to explain a configuration of an optical disk drive to which the present invention has been applied. The optical disk drive is configured so that it reproduces data on multiple types of optical disk, for example, CD and DVD. When the optical disk drive detects that an optical disk is loaded, the type thereof is determined, and the optical disk is irradiated with a laser beam with a property suitable for the type of the optical disk, so as to read the data, and the like.

Determination of the type of the optical disk is performed in such a manner as the following: while the optical disk is in halt condition, the objective lens through which a laser beam is irradiated is moved from a position far from the optical disk (lower side) to a position close to the optical disk (upper side) at a constant speed, and a time length from when the surface of the optical disk is detected to the time when the recording layer is detected is measured. Since this time length is proportional to the distance from the optical disk surface to the recording layer, it is possible to discriminate between CD and DVD, each having different distance in specification, from the disk surface to the recording layer.

Here, in the optical disk drive according to the present embodiment, it is configured such that after the type of the optical disk is determined, the reflectivity of the optical disk is measured prior to reading actual data. Based on the measurement result of the reflectivity, gain of each servo amplifier is adjusted so as to normalize the reflectivity variation caused by an individual difference of the optical disk, thereby achieving a stable reading of data.

In the following embodiments, an example in which after the type of the optical disk is determined, the reflectivity of the optical disk is measured prior to reading the actual data. However, the present invention is not limited to the measurement of the reflectivity of the optical disk. The present invention is also applicable to another case such as a process for determining a layer of the optical disk (discriminating between DVD-SL and DL, etc.), focus-on process, a process for determining more specific type of optical disk (discriminating between CD and CD-RW, etc).

Here, the process for determining the layer of the optical disk can be performed by measuring the number of peaks of FE signal, for example. Since the focus-on process becomes more stable when the optical disk is rotated, the present invention may be applied effectively.

Furthermore, the optical disk drive is not limited to the one for reproducing data on CD or DVD, and another type of disk drive is also applicable, for example, a disk drive for reproducing data on SACD, Blue-ray, HDDVD, and the like. It is not limited to a playback only machine, but an optical disk recording machine, optical disk recording/reproducing machine, and the like are also applicable.

As shown in FIG. 1, the optical disk drive is provided with a spindle motor 12, an optical pickup 15 having two-axle actuator for moving the objective lens 13 vertically (focusing direction), a feed motor 16, a driver amplifier 17, RF amplifier 18, servo signal processing DSP 19, servo processing microcomputer 20, and signal demodulation/ECC processing circuit 21. However, the present invention is not limited to the above configuration. Another functional blocks, for example, associated with reproducing process, user interface, and the like, which are not directly related to the feature of the present invention, are omitted.

The optical disk drive rotationally drives an optical disk 100 such as DVD and CD, by the spindle motor 12. Then, laser beams are emitted from the optical pickup 15, the objective lens 13 collects the laser beams onto the recording layer of the optical disk 100, and the optical pickup 15 reads a reflected light. At this stage, for each case where DVD is loaded or CD is loaded, an objective lens is used with a function to emit the laser beam corresponding to NA of each format, as appropriate according to the wavelength of the laser beam, whereby an optimum focusing onto the recording layer can be performed.

An optical signal (photo detector signal) read by the optical pickup 15 is subjected to operational amplification by the RF amplifier 18, and then outputted, as servo error signal and PI signal, to the servo signal processing DSP 19 and the signal demodulation/ECC processing circuit 21.

The servo signal processing DSP 19 moves the objective lens 13 by the two-axle actuator 14 in the focusing direction and in the tracking direction, controls movement of the optical pickup 15 by the feed motor 16 in the tracking direction, controls rotation of the spindle motor 12, and the like. A servo drive signal or the like outputted from the servo signal processing DSP 19 is transmitted to the two-axle actuator 14, the feed motor 16, and the spindle motor 12, by way of the driver amplifier 17.

The signal demodulation/ECC processing circuit 21, which performs a predetermined demodulation, error correction, and the like, appropriate for the servo signal processing DSP 19 and the optical disk, is controlled by the servo processing microcomputer 20 according to a predetermined control program.

Then, the optical disk drive applies to digital signal (DATA) thus obtained, a processing such as analogue conversion, in the host CPU and back-end LSI, so as to reproduce audio data, video data, and the like.

In order to carry out a processing peculiar to the present embodiment, the servo signal DSP 19 is provided with A/D converter (not illustrated), peak detecting section 19a, and focus controlling section 10b. The servo processing microcomputer 20 is provided with a time measuring section 20a, travel time setting section 20b, and reflectivity measuring section 20c. It is to be noted that those functional elements may be provided in another block.

The peak detecting section 19a detects a peak of the PI signal based on a reflected light from the optical disk 100. When objective lens 13 is moved from the lower part to the upper part, the first small peak indicates that the focus is located on the surface of the optical disk. The next large peak indicates that the focus is located on a recording layer (in multiple layers, the lowermost recording layer or the medium position for the case of two layers).

The time measuring section 20a is provided with a timer and the timer measures a length of time, according to a predetermined standard.

Travel time setting section 20b sets a travel time for the objective lens 13 to move upwardly, and travel starting time to move downwardly, and the like, based on the measurement results of the time measuring section 20a.

Focus control section 19b controls vertical movement of the objective lens 13 by the two-axle actuator 14. In the present embodiment, in particular, the focus control section controls travel time or the like in the vertical movement of the objective lens 13 during the reflectivity measurement process, after the optical disk discrimination process is performed.

Next, there will be explained the optical disk discrimination process and the reflectivity measurement process subsequent to the discrimination process in the optical disk drive according to the present invention.

Figure 2:
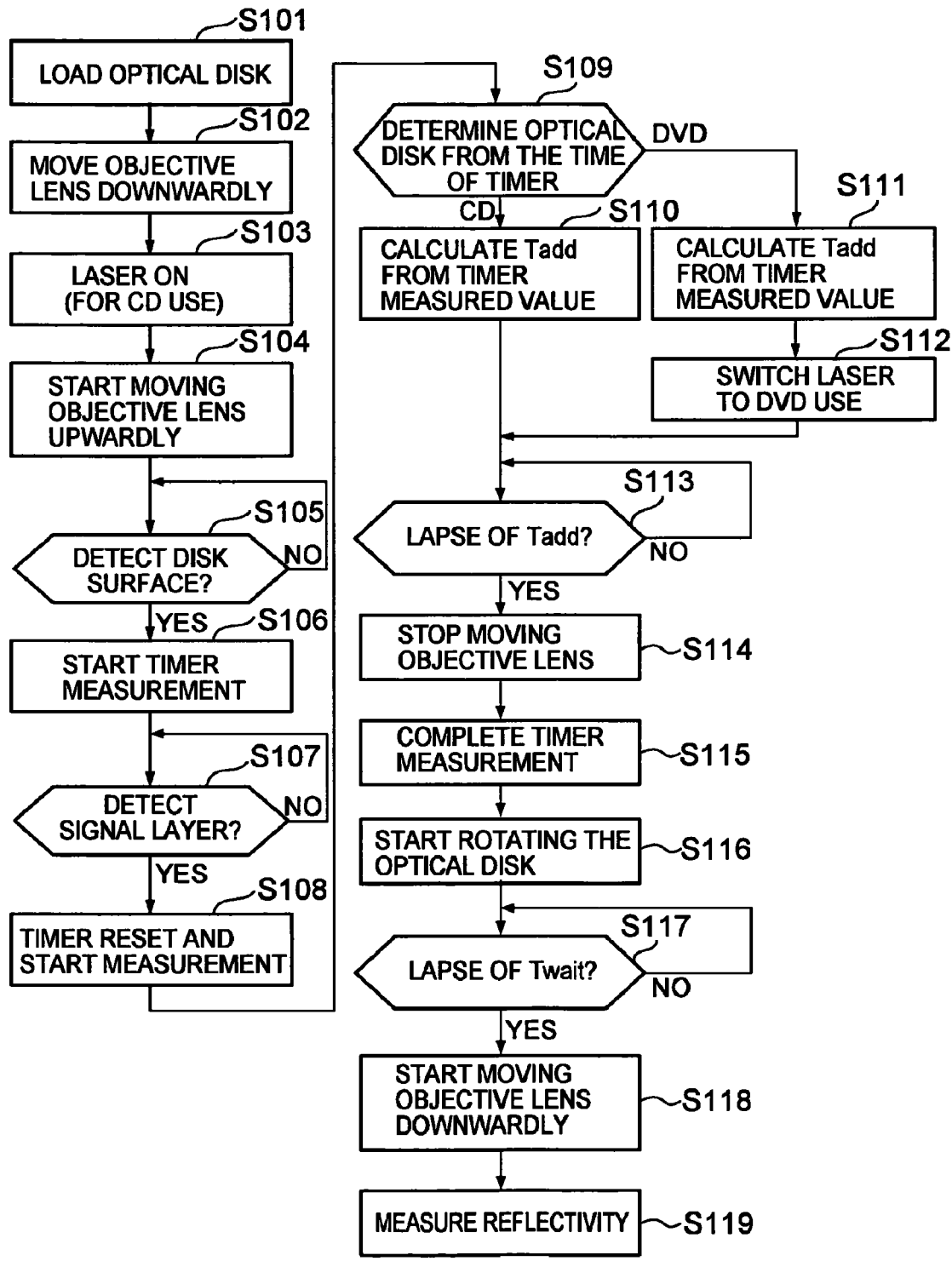
FIG. 2 is a flow diagram showing an example of flow in the optical disk discrimination process and reflectivity measurement process.
Figure 3:
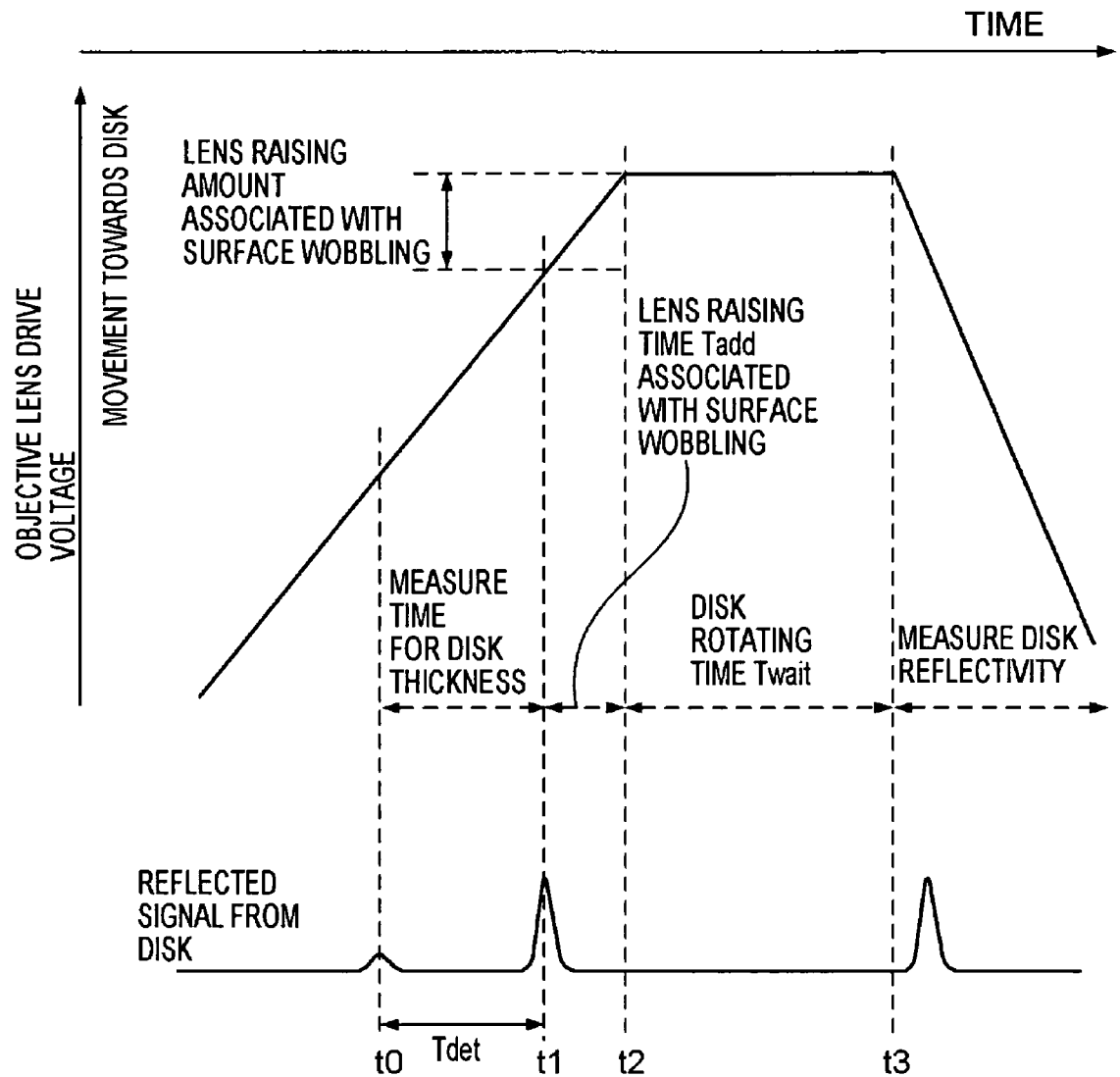
FIG. 3 is a timing diagram showing a time relationship between a drive signal (drive voltage) for driving the objective lens 13, and a detected reflected signal (PI signal) from a disk.

FIG. 2 is a flow diagram showing an example of flow for the optical disk discrimination process and the reflectivity measurement process. FIG. 3 is a timing diagram showing a time relationship between a drive signal (drive voltage) for driving the objective lens 13, and a reflected signal (PI signal) from a disk being detected.

In the present embodiment, vertical movement of the objective lens 13 is controlled by applying a drive voltage to the two-axle actuator 14. The drive voltage is applied in a form of ramp as shown in FIG. 3, so that the objective lens 13 approaches the optical disk 100 at a constant speed.

Temporal change of the vertical position of the objective lens 13 has almost the same shape as that of the drive voltage. In other words, in the example of FIG. 3, the objective lens moves at a constant speed in a direction approaching the optical disk 100 in the time period (until t2) when the drive voltage is increasing gradually at a constant rate, it stops at the current position in the time period (from t2 to t3) when the drive voltage keeps a certain value, and the objective lens moves at a constant speed in a direction away from the optical disk 100 in the time period (from t3) when the drive voltage is decreasing gradually at a constant rate. It is to be noted that since the speed as described above is affected by the sensitivity of the two-axle actuator, variation in outputs from the drive circuit, and ambient surrounding, or the like, the speed is not always the same value.

The optical disk discrimination process in the present embodiment is performed, for example, at the time of loading the optical disk 100, starting the optical disk drive in a state that the optical disk 100 is loaded, or the like (S101).

When the optical disk 100 is detected, the focus control section 19b moves the objective lens 13 downwardly, and it is kept away from optical disk 100 (S102). It is a matter of course that if a sufficient distance is ensured between the objective lens 13 and the optical disk 100 in the initial stage, the step above may be omitted.

Then, the laser beam is turned ON (S103). In the process for discriminating the optical disk 100, firstly, a laser beam for CD use is emitted. It may be arbitrary decided depending on the system in the optical disk drive, which laser beam is emitted, used for either type of optical disk.

Subsequently, the focus control section 19b starts moving the objective lens 13 upwardly at a constant speed in a state that the laser beam is emitted (S104). Accordingly, the objective lens 13 moves closer to the optical disk. At this stage, the optical disc 100 is not rotated and kept still.

The peak detecting section 19a inputs PI signal, and monitors that the focus of the laser beam is positioned on the surface of the optical disk 100 (S105).

When it is detected the focus is positioned on the surface of the optical disk 100 (S105: YES, FIG. 3: t0), the time measuring section 20a starts measurement (S106).

Furthermore, the objective lens 13 continues moving in the upward direction at a constant speed. At this stage, the peak detecting section 19a monitors that the focus of the laser beam captures the recording layer of the optical disk 100 (S107).

When it is detected that the focus captures the recording layer of the optical disk 100 (S107: Yes, FIG. 3: t1), the time measuring section 20a stops measurement, and obtains a travel time Tdet from the surface of the optical disk 100 to the recording layer. The time measuring section 20a resets the timer, and starts measurement again (S108). The focus control section 19b continues applying drive voltage, and the objective lens 13 continues ascending.

Figure 4A:
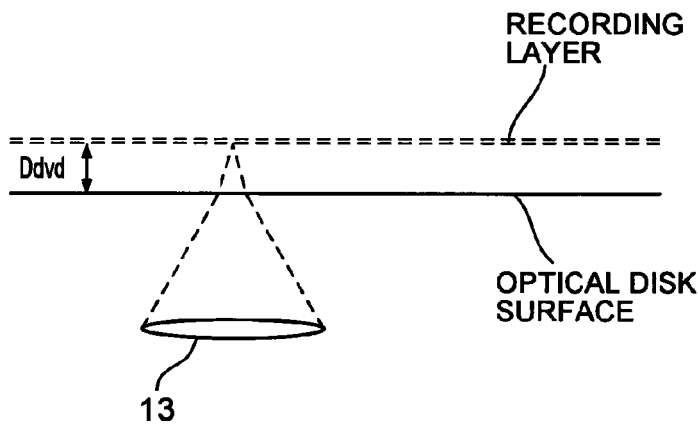
FIG. 4A is a chart showing a distance Ddvd from a disk surface of DVD to a recording layer.
Figure 4B:
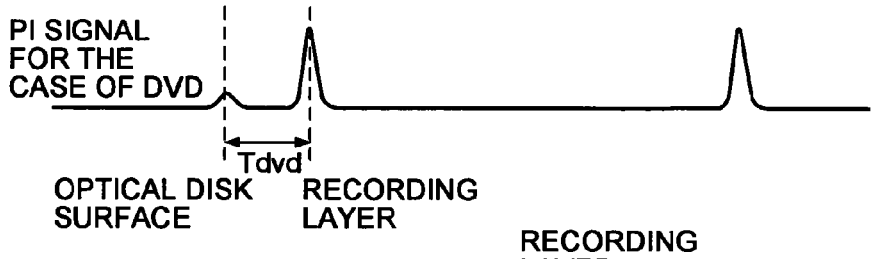
FIG. 4B is a chart showing a travel time Tdet for the case of DVD.
Figure 4C:
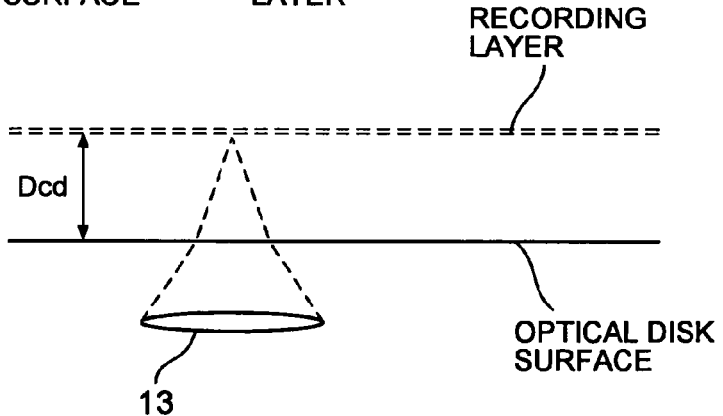
FIG. 4C is a chart showing a distance Dcd from the disk surface of CD to the recording layer.
Figure 4D:
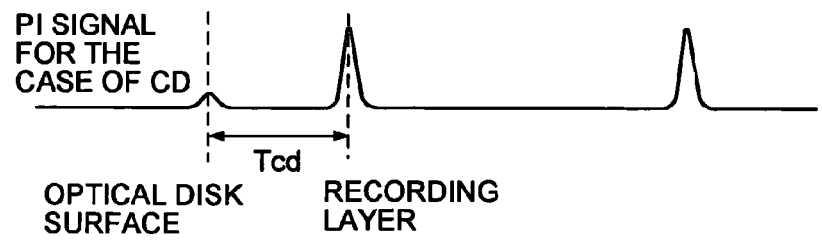
FIG. 4D is a chart showing a travel time Tdet for the case of CD.

At the same time, the optical disk drive performs discriminating of the optical disk 100 being loaded, based on Tdet thus measured (S109). Specifically, if Tdet is equal to or more than a predetermined value, it is possible to determine that the optical disk 100 is a CD, but otherwise, the optical disk 100 can be determined as DVD. This discrimination is possible with the following reason: As a standard, the distance Ddvd (see FIG. 4A) from the disk surface of DVD to a recording layer (in the case of multilayer, the lowermost recording layer or middle position as for two layers) is shorter than the distance Dcd (see FIG. 4C) from the disk surface of CD to the recording layer. Accordingly, the travel time Tdet for the case of DVD (=Tdvd, see FIG. 4B) is also shorter than the travel time Tdet for the case of CD (=Tcd, see FIG. 4D).

When the type of the optical disk 100 is determined, a process for calculating Tadd is performed (S110, S111).

Here, meaning of Tadd and calculation method of Tadd thereof will be explained with reference to FIG. 5, assuming that in-periphery maximum surface wobbling amount as a standard of the optical disk 100 is ±Vd for instance. Since the surface wobbling amount generally becomes larger on the outer periphery of the optical disk 100, in the present processing, it is desirable to locate the objective lens 13 on the inner periphery side in the recording area of the optical disk 100.

Figure 5:
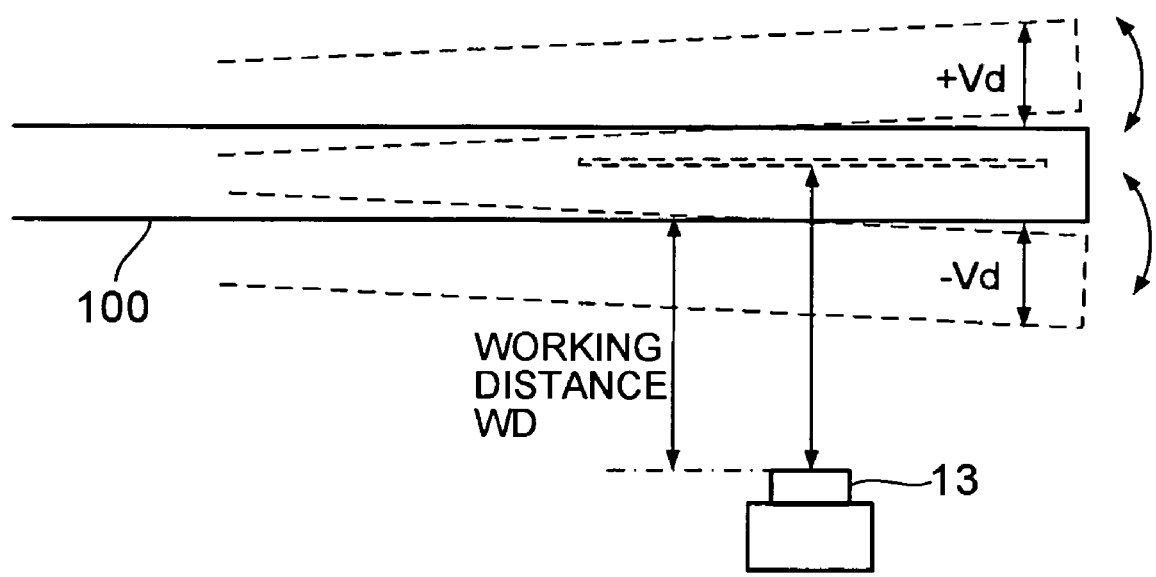
FIG. 5 is a diagram to explain a meaning of Tadd and a method for calculation thereof.

When the optical disk 100 is rotated so as to measure a reflectivity, in a state that the focus is capturing the recording layer, the surface wobbling of width ±Vd at the maximum occurs as shown in FIG. 5.

Accordingly, it is necessary to further raise the objective lens 13 for the focus to capture the recording layer, for the case where upward maximum surface wobbling is occurring. However, if it is raised too high, the objective lens may come too much close to the surface of the optical disk 100, for the case where downward maximum surface wobbling is occurring. Therefore, it is preferable that such ascending should be within the minimally required amount. Tadd indicates a time length during when applying the drive voltage is continued, in order to obtain the minimum required ascending amount.

There may be a situation where on the optical disk 100, upward maximum surface wobbling (|Vd|) occurs on one surface of the disk, and also downward maximum surface wobbling (|Vd|) occurs on the other surface of the disk. Therefore, considering the case that the above discrimination process is performed on such optical disk, the minimum required ascending amount for the focus to capture the recording layer on a certain position of the optical disk 100 is equal to the in-periphery maximum surface wobbling amount Vd×2.

When the travel speed of the objective lens 13 at the time of measuring Tdet is assumed as Vact, considering a refractive index np of the disk substrate material, Vact is defined as the following:

$$Vact = (\text{substrate thickness of the optical disk being determined}/np)/Tdet.$$

Therefore, if the travel speed Vact is constant, $$Tadd = 2Vd/Vact.$$

Accordingly, even when the maximum surface wobbling occurs, the focus is positioned above the recording layer. Therefore, by moving the objective lens downwardly, it is possible for the focus to capture the recording layer.

If the working distance (distance between the object and the tip of the lens) of the objective lens 13 is assumed as WD, in the present embodiment, it is necessary to satisfy the range of 2Vd<(WD−2Vd), so as to further raise the objective lens 13 by 2Vd. In view of the point above, the present embodiment is based on the premise that WD>4Vd is established. A situation where WD of the objective lens 13 is short and the premise above is not satisfied will be explained below.

Here, a specific example will be explained in the case where CD disk substrate thickness Dcd is assumed as 1.2 mm, DVD disk substrate thickness is assumed as 0.6 mm, and the refractive index ndp of polycarbonate as a material of the disk substrate is assumed as 1.55. Of course, these values can be changed appropriately, and a margin may be taken into consideration. The in-periphery maximum surface wobbling amount Vd is assumed as ±0.2 mm, since the measurement is carried out at the disk inner periphery part where the disk surface wobbling becomes the minimum.

When CD: Tcd=60 ms is measured (S110), $$Tadd = 0.20 \times 60/(1.2/1.55) = 15.5 \text{ [ms]}, \text{ and}$$

when DVD: Tdvd=30 ms is measured (S111), $$Tadd = 0.20 \times 30/(0.6/1.55) = 15.5 \text{ [ms]}.$$

When the Tadd is calculated, the time measuring section 20a measures Tadd to lapse from t1 (S113). During this period, the drive voltage is applied, which is increased at a constant rate. Therefore, the objective lens 13 continues rising at the constant speed of Vact. During the process above, if the optical disk 100 is determined as DVD, a changeover process is performed to switch the laser to DVD use (S112).

After the lapse of Tadd (S117: Yes), the focus control section 19b stops moving of the objective lens 13, and outputs the drive signal to keep the objective lens staying at the position (S114). Furthermore, the time measuring operation by the time measuring section 20a is also completed (S115).

As thus described, since the movement of the objective lens 13 is controlled based on the discriminating time actually measured, it is possible to cope with the variable sensitivities of the two-axle actuator with respect to each individual object, variations in the drive circuit, and change in sensitivity due to the environment.

Further in the present embodiment, the travel amount of the objective lens 13 is controlled by use of time length. It is configured in this manner because, a travel speed of the objective lens 13 can be calculated from the travel time of the objective lens 13 and thickness of the disk substrate (i.e., travel distance) in the discrimination process of the optical disk 100, and controlling the travel amount of the objective lens 13 by use of time length is easier than directly controlling the travel amount.

When the movement of the objective lens 13 is stopped, the servo signal processing DSP 19 controls the spindle motor 12 and starts rotating the optical disk 100, so as to measure the reflectivity (S116). Since the reflectivity of the optical disk 100 is different between pit and mirror surface (between land and groove), when the reflectivity is measured, the optical disk 100 is to be rotated in order to prevent variations in measurement results. The operation above is the same also in the focus-on process and the discrimination process for the layer of the optical disk 100.

The rotation of the optical disk 100 may be started immediately after the signal layer detecting process (S107). In this case, the rotating time Twait of the disk as shown in FIG. 3 is started from t1.

Until the rotation of the optical disk 100 becomes stable, for example, a lapse of predetermined time period Twait is waited (S117), and the focus controlling section 19b starts downward moving of the objective lens 13 (S118). The time measuring section 20a is capable of measuring the predetermined time period Twait as well. It is configured that Twait is determined in advance, based on the property and the like of the spindle motor 12.

Then, when the peak detecting section 19a detects that the focus recaptures the recording layer, the reflectivity measuring section 10c measures the reflectivity of the optical disk 100 (S119), and the present process is completed.

Consequently, according to the present embodiment, at the time of measuring the reflectivity, it is possible not only to cope with the variable sensitivities of the two-axle actuator 14 with respect to each individual object, and change in sensitivity due to the environment, but also to perform both the discrimination process of the optical disk 100 and the measuring process of the optical disk reflectivity, within the period of one vertical reciprocating movement of the objective lens 13. Therefore, the processing time can be made shorter, and thus reading of the optical disk can be started earlier.

In the above example, after the type of the optical disk is determined, the objective lens 13 is continuously moved upwardly at the same speed (from t1 to t2 in FIG. 3). Then, when the objective lens 13 is raised to the degree of the maximum surface wobbling, the raised state of the objective lens 13 is maintained until the rotation of the optical disk 100 becomes stable, that is, during the period of Twait.

During the period above, the objective lens 13 and the optical disk 100 are close to each other. However, in order to enhance the safety, it is preferable to render the time length as short as possible when the objective lens 13 and the optical disk 100 are kept close. Furthermore, as the travel speed is made lower, the safety is enhanced more.

Figure 6:
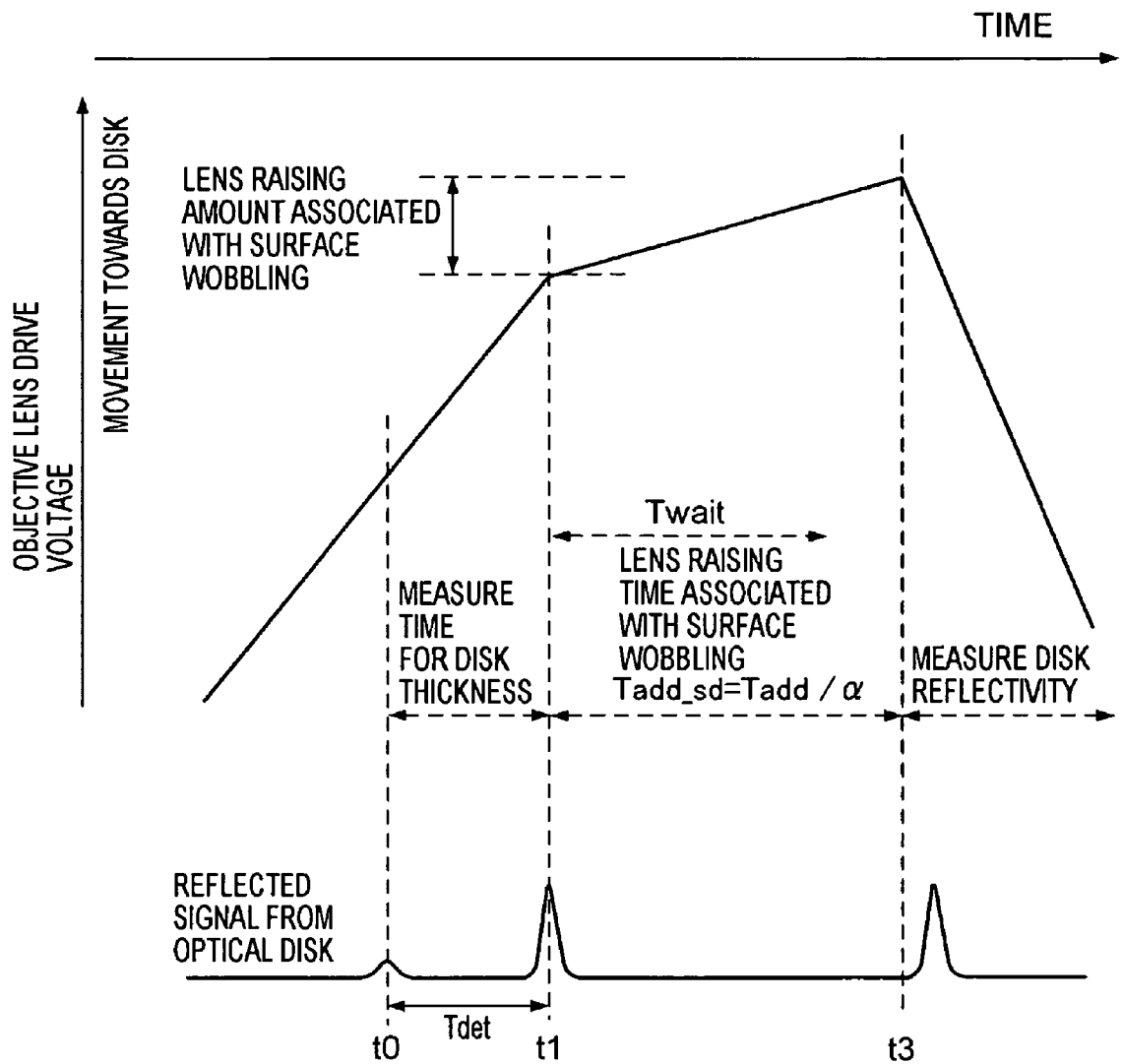
FIG. 6 is a timing diagram in the case where the travel speed is decelerated assuming α as a fixed value.
Figure 7:
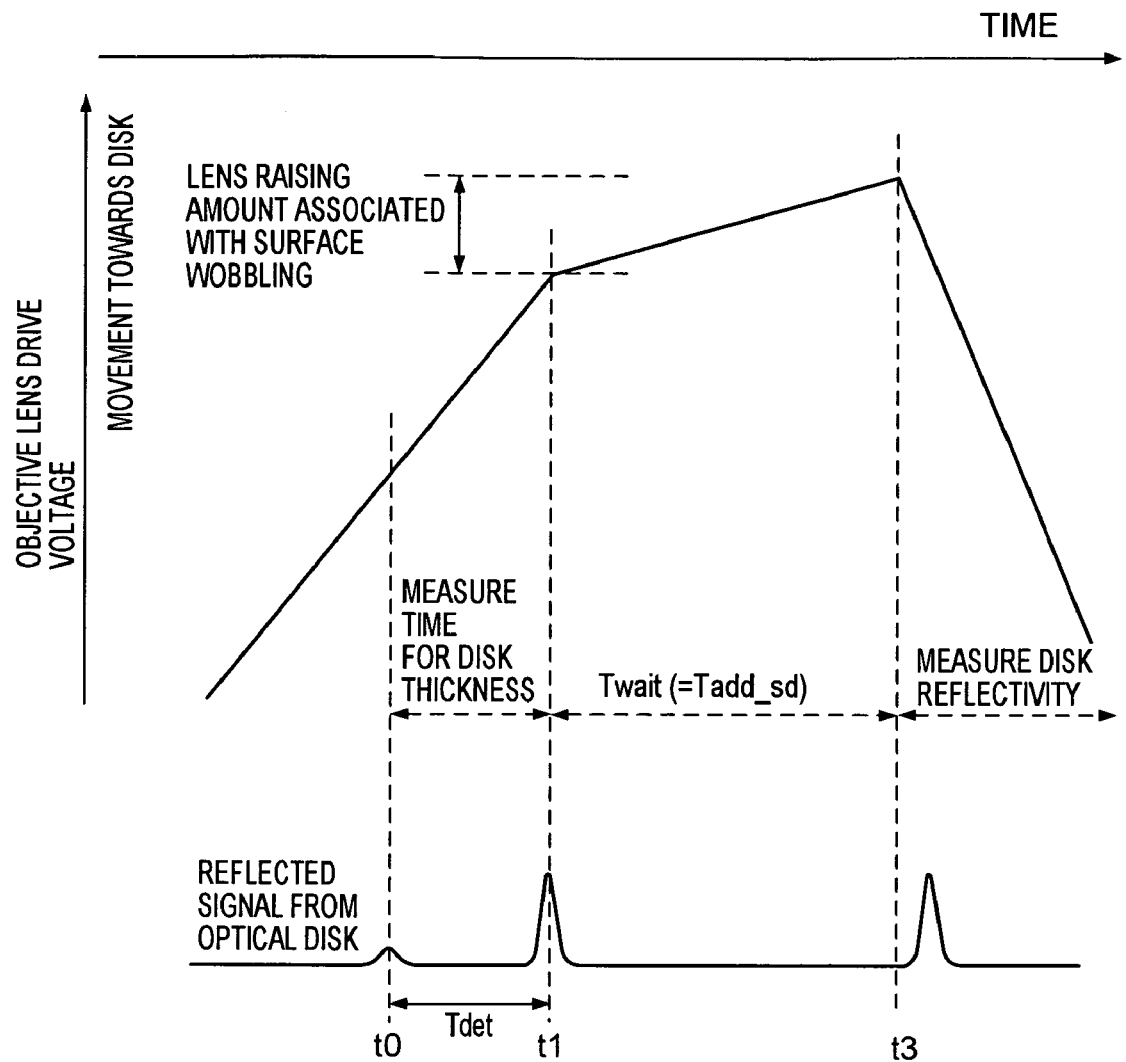
FIG. 7 is a timing diagram in the case where the travel speed is decelerated by calculating α.

Accordingly, a control as shown in FIG. 6 or FIG. 7 may be carried out. Here, when the type of the optical disk 100 is determined at t1, the drive voltage is adjusted so that the travel speed of the objective lens 13 is decelerated.

Here, the travel time after the travel speed is decelerated is assumed as Tadd_sd, and deceleration ratio is assumed as α (speed after deceleration=Vact×α). The deceleration ratio α may be a fixed value, or alternatively, it may be calculated every time.

Firstly, with reference to FIG. 6, a situation where the deceleration ratio α is assumed as a fixed value will be explained. Since a fixed deceleration ratio can be ensured in this situation, it is effective in the case where importance is placed on the deceleration. The deceleration ratio α is set to less than one, for example, it may be a quarter.

In the situation above, $$Tadd\_sd = Tadd/\alpha.$$

Here, also in the case where the sensitivity of the two-axle actuator 14 is high and the travel speed Vact becomes higher, it is necessary to satisfy the following condition, so that Tadd_sd is longer than the time Twait which is the time length until the rotation of the optical disk 100 becomes stable.

$$\alpha \leq (VD/Vact)/Twait$$

Next, with reference to FIG. 7, a situation where the deceleration ratio α is calculated every time will be explained. Since, in this situation, it is assumed that Tadd_sd=Twait, and the objective lens 13 is raised to the degree of surface wobbling amount within Twait, it is effective in the case where importance is placed on reduction of startup time.

In the situation above, $$\alpha = Tadd/Twait.$$

It is to be noted here that in order to avoid acceleration which makes α exceed one, it is assumed that α=1 when Tadd>Twait, keeping the speed of the objective lens 13 unchanged.

Figure 8:
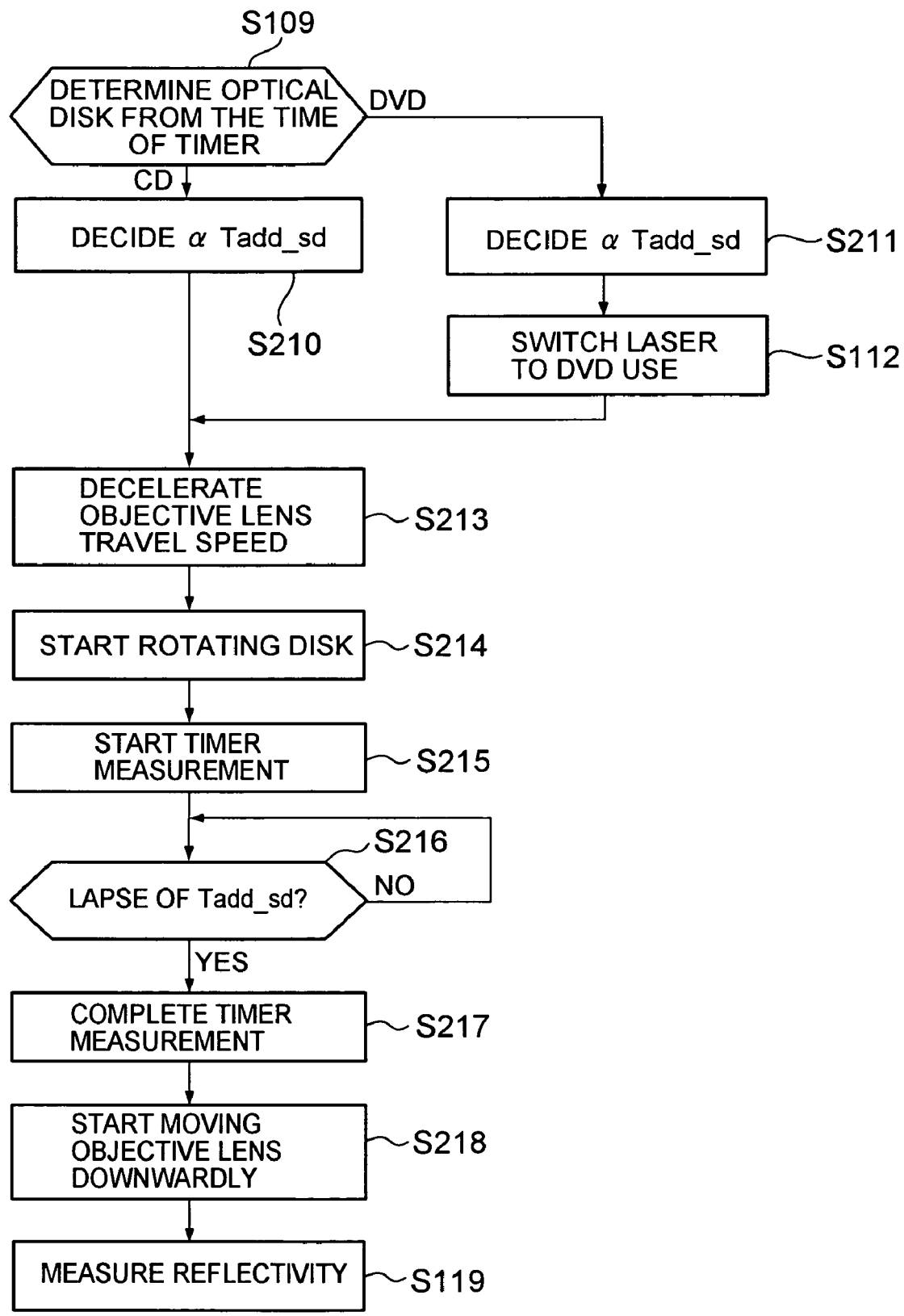
FIG. 8 is a flow diagram to explain the processing flow in the case where the travel speed is decelerated.

With reference to the flow diagram of FIG. 8, a processing flow in the case where the travel speed of the objective lens 13 is decelerated. Here, points different from the example of FIG. 3 are mainly explained.

In other words, as described above, as a result of discriminating the type of the optical disk in the process (S109), if the optical disk is a CD, Tadd is calculated, and then, Tadd_sd and a are determined (S210).

On the other hand, if the optical disk is a DVD, Tadd is calculated, and then, Tadd_sd and a are determined (S211). Subsequently, the laser is switched to DVD use (S112).

In any of the situations above, if α is a fixed value, Tadd_sd is determined by Tadd_sd=Tadd/α, also determining the fixed value α.

When α is to be calculated, a and Tadd_sd are determined by α=Tadd/Twait and Tadd_sd=Twait.

Then, the travel speed of the objective lens 13 is decelerated to Vact×α (S213). The above operation can be established, for example, by setting a change rate of the drive voltage, as a value obtained by multiplying the change rate of the drive voltage at the time of discrimination process, by α.

The travel speed of the objective lens 13 is decelerated and simultaneously, rotation of the optical disk is started (S214). Then, a time measurement by the time measuring section 20a is started (S215).

Then, the upward movement of the objective lens 13 continues until a lapse of Tadd_sd (S216). After the lapse of Tadd_sd, the time measurement is completed (S216) and the downward movement of the objective lens 13 is started for measuring the reflectivity (S218).

As thus described, according to the present embodiment, at the time of measuring the reflectivity, it is possible not only to cope with the variable sensitivities of the two-axle actuator 14 with respect to each individual object, and the change in sensitivity due to the environment, but also to make the time length extremely short, during when the objective lens 13 is in a state of closest approach the optical disk 100.

Then, when it is detected that the focus captures the recording layer again, the reflectivity measuring section 19c measures the reflectivity of the optical disk 100 (S119), and the present process is completed.

In the present embodiment, it has been explained that the reflectivity of the optical disk is measured subsequent to the optical disk discrimination process. However, as described above, the algorithm of the present invention is not limited to measuring the reflectivity. It may also be applied to another processing performed subsequent to the optical disk discrimination process, for example, a focus-on process for reading a signal and the like, a process for discriminating a layer of the optical disk, and a process for discriminating more specific type of the optical disk, or the like.

As thus described, the above embodiment is based on the premise that the condition that the working distance (WD) of the objective lens 13 is established as WD>4Vd.

Here, an embodiment how the movement of the objective lens 13 is controlled in the case where the WD of the objective lens 13 is short and the premise above is not satisfied.

Figure 9:
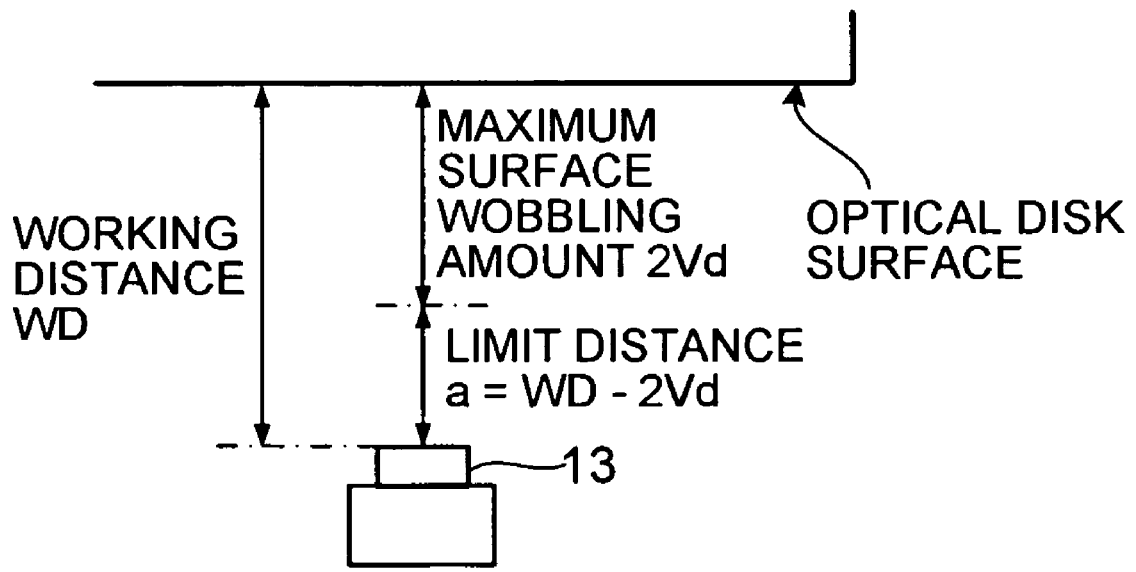
FIG. 9 is a diagram for explaining limit distance a, which is capable of raising the objective lens safely.
Figure 10A:
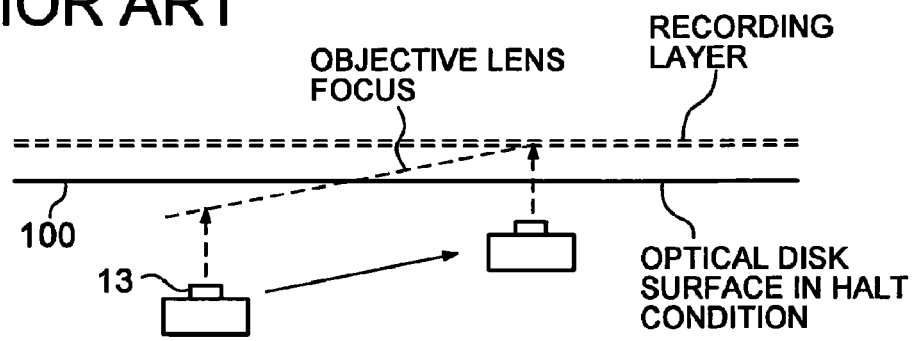
FIG. 10A is a diagram showing a movement of the objective lens with respect to the optical disk in the optical disk discrimination process.
Figure 10B:
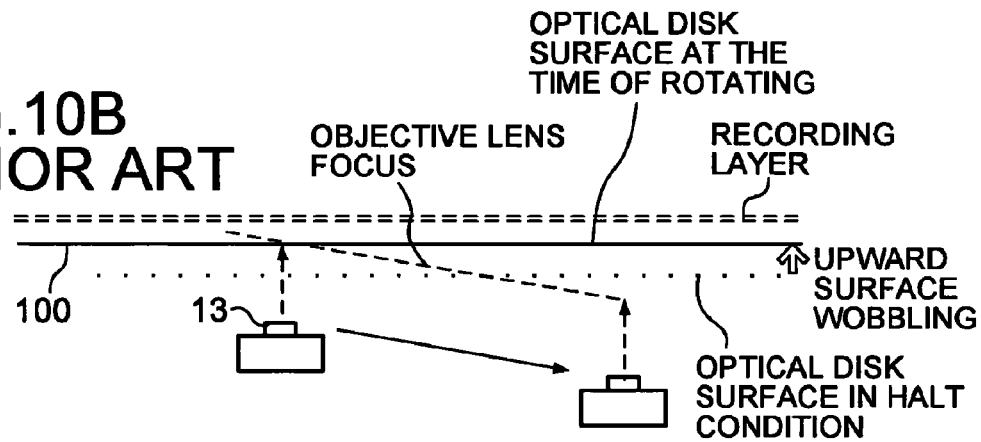
FIG. 10B is a diagram showing the case where upward surface wobbling occurs and the focus is displaced from the recording layer.
Figure 10C:
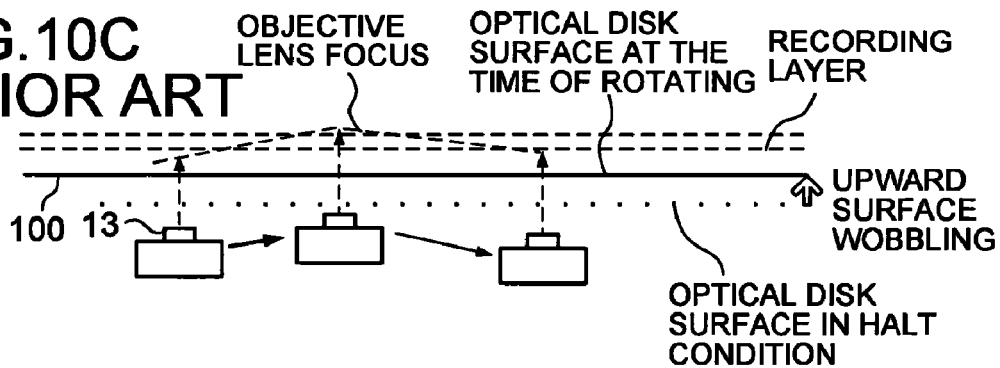
FIG. 10C is a diagram showing the case where the focus captures the recording layer.
Figure 10D:
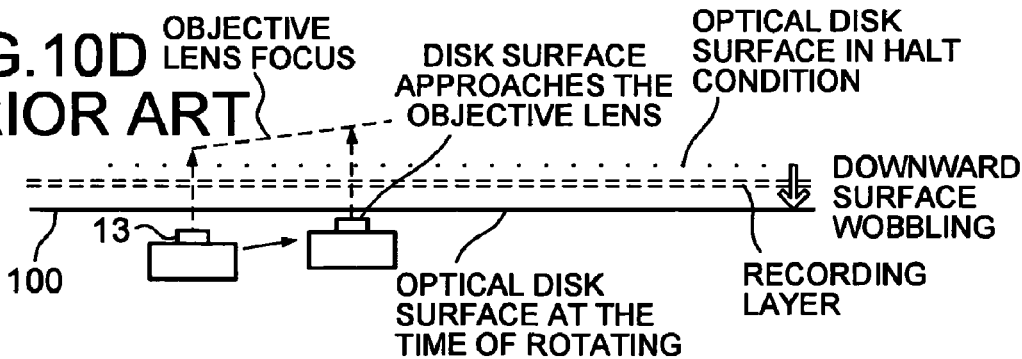
FIG. 10D is a diagram showing the case where the surface of the optical disk approaches the objective lens.

In this case, a marginal distance a, which allows the objective lens 13 to rise safely, is represented by a=WD−2Vd as shown in FIG. 9. In general, WD is different between the laser irradiation for DVD and the laser irradiation for CD. However, at the time of measuring the reflectivity, the process for discriminating the optical disk 100 is completed, and a laser suitable for the determined optical disk 100 is irradiated. Therefore, it is possible to calculate the marginal distance a, based on the WD associated with the laser irradiation actually used.

In the present embodiment, if the travel speed Vact is assumed as constant, the marginal distance a is used instead of the in-periphery maximum surface wobbling amount Vd, and Tadd is obtained according to Tadd=a/Vact. By use of Tadd thus obtained, the ascending control of the objective lens 13 as described above is carried out.

It is to be noted that if the travel speed is decelerated by use of the deceleration ratio α, the operation can be performed in the similar manner as the above embodiment by use of thus obtained Tadd.

In the present embodiment, the ascending amount of the objective lens 13 is smaller than the in-periphery maximum surface wobbling amount Vd, there is a possibility that the focus does not reach the recording layer and the focus cannot capture the recording layer at the time of downward moving.

Therefore, if the recording layer is not detected even after the downward movement for a certain period of time, or a reflected signal indicates a surface of the optical disc 100, the objective lens is moved upwardly again. When the focus captures the recording layer, measurement of the reflectivity and the like are carried out.

In the present embodiment, the movement of the objective lens 13 is controlled based on the discriminating time actually measured. Therefore, at the time of measuring the reflectivity, it is possible to cope with the variable sensitivities of the two-axle actuator 14 with respect to each individual object, variations in the drive circuit, and the change in sensitivity due to the environment.

Further, in the above example, the moving speed of the objective lens 13 was once decreased, and then the objective lens was moved upward until the lapse of Tass_sd. However, much simple constitution could also be implemented as follows. Namely, to predetermine the ascending amount U from the position of the focus capturing the recording layer, based on an in-periphery maximum surface wobbling amount Vd of the optical disk. When the focus captures the recording layer, the moving speed of the objective lens is reduced, and the objective lens is moved upward by a distance U with the lapse of Twait which is a time required until rotating of the optical disc becomes stable, before the downward movement is started.

What is claimed is:
1. An optical disk drive in which laser beams are emitted to an optical disk in a state of not rotated, and simultaneously an objective lens which collects said laser beams is moved to a direction approaching said optical disk at a constant speed, a time length required for moving a focused position of said laser beams from a surface of said optical disk to a recording layer is measured by observing a reflected light from said optical disk, and a type of said optical disk is determined based on the time length Tdet thus measured, said optical disk drive comprises,
  a calculating means which calculates an additional travel time Tadd, based on said Tdet and an in-periphery maximum surface wobbling amount (Vd×2) of said optical disk,
  a moving means which further moves said objective lens for said additional travel time Tadd at said constant speed after said laser beams are focused on said recording layer,
  a rotating means which rotates said optical disk after the laser beams focuses on the recording layer,
  a move-away means which moves said objective lens in a direction to be away from said optical disk, and
  a detecting means which detects that said laser beams are focused on said recording layer of said optical disk after said move-away process is started;
  wherein the moving means executes a portion of a first half of a reciprocating movement and the move-away means executes a second half of the reciprocating movement.

2. An optical disk drive in which laser beams are emitted to an optical disk in a state of not rotated, and simultaneously an objective lens which collects said laser beams is moved in a direction approaching said optical disk at a constant speed, a time length required for moving a focused position of said laser beams from a surface of said optical disk to a recording layer is measured by observing a reflected light from said optical disk, and a type of said optical disk is determined based on the time Tdet thus measured, said optical disk drive comprises,
  a calculating means which calculates a time Tadd, based on said Tdet and an in-periphery maximum surface wobbling amount (Vd×2) of said optical disk,
  an additional travel time calculating means which calculates an additional travel time Tadd_sd, based on said Tadd and a predetermined decelerating ratio $\alpha$,
  a moving means which further moves said objective lens for said additional travel time Tadd_sd at a speed obtained by multiplying said constant speed by said decelerating ratio $\alpha$, after said laser beams are focused on the recording layer,
  a rotating means which rotates said optical disk after the laser beams focuses on the recording layer,
  a move-away means which moves said objective lens in a direction to be away from said optical disk, and
  a detecting means which detects that said laser beams are focused on said recording layer of said optical disk after said move-away process is started;
  wherein the moving means executes a portion of a first half of a reciprocating movement and the move-away means executes a second half of the reciprocating movement.

3. An optical disk drive control method in an optical disk drive in which laser beams are emitted to an optical disk in a state of not rotated, and simultaneously an objective lens which collects said laser beams is moved to a direction approaching said optical disk at a constant speed, a time length required for moving a focused position of said laser beams from a surface of said optical disk to a recording layer is measured by observing a reflected light from said optical disk, and a type of said optical disk is determined based on said time Tdet thus measured, said optical disk drive control method comprising,
  a calculating step which calculates an additional travel time Tadd, based on said Tdet and an in-periphery maximum surface wobbling amount (Vd×2) of said optical disk,
  a moving step which further moves said objective lens for said additional travel time Tadd at said constant speed after said laser beams are focused on said recording layer,
  a rotating step which rotates said optical disk,
  a move-away step which moves said objective lens in a direction to be away from said optical disk, and
  a detecting step which detects that said laser beams are focused on said recording layer of said optical disk after said move-away process is started;
  wherein the moving step executes a portion of a first half of a reciprocating movement and the move-away step executes a second half of the reciprocating movement.

4. An optical disk drive control method in an optical disk drive in which laser beams are emitted to an optical disk in a state of not rotated, and simultaneously an objective lens which collects said laser beams is moved to a direction approaching said optical disk at a constant speed, a time length required for moving a focused position of said laser beams from a surface of said optical disk to a recording layer is measured by observing a reflected light from said optical disk, and a type of said optical disk is determined based on said time Tdet thus measured, said optical disk drive control method comprising,
  a calculating step which calculates a time Tadd, based on said Tdet and an in-periphery maximum surface wobbling amount (Vd×2) of said optical disk,
  an additional travel time calculating step which calculates an additional travel time Tadd_sd, based on said Tadd and a predetermined decelerating ratio $\alpha$,
  a moving step which further moves said objective lens for the additional travel time Tadd_sd at a speed obtained by multiplying said constant speed by said decelerating ratio $\alpha$, after said laser beams are focused on the recording layer,
  a rotating step which rotates said optical disk,
  a move-away step which moves said objective lens in a direction to be away from said optical disk, and
  a detecting step which detects that said laser beams are focused on said recording layer of said optical disk after said move-away process is started;
  wherein the moving step executes a portion of a first half of a reciprocating movement and the move-away step executes a second half of the reciprocating movement.

5. An optical disk drive in which laser beams are emitted to an optical disk in a state of not rotated, and simultaneously an objective lens which collects said laser beams is moved to a direction approaching said optical disk at a constant speed, a time length required for moving a focused position of said laser beams from a surface of said optical disk to a recording layer is measured by observing a reflected light from said optical disk, and a type of said optical disk is determined based on the time length Tdet thus measured, said optical disk drive comprises,
  a moving means which rotates said optical disk after the laser beams focuses on the recording layer and further moves said objective lens for a predetermined distance based on an in-periphery maximum surface wobbling amount (Vd×2) of the optical disk under decelerated travel speed, a move-away means which moves said objective lens in a direction to be away from said optical disk, and a detecting means which detects that said laser beams are focused on said recording layer of said optical disk after said move-away process is started;

wherein the moving means executes a portion of a first half of a reciprocating movement and the move-away means executes a second half of the reciprocating movement.

6. The optical disk drive according to claim 1, wherein, when said detecting means detects that said laser beams are focused on said recording layer of said optical disk after said move-away process is started, any of a process for measuring a reflectivity of said optical disk, a process for discriminating said optical disk layer, and a focus-on process is carried out.

7. The optical disk drive control method according to claim 3, wherein, after said detecting step, any of a step for measuring a reflectivity of said optical disk, a step for discriminating said optical disk layer, and a focus-on step is carried out.

* * * * *